UNITED STATES PATENT OFFICE.

JOSEPH NERKING, OF DUSSELDORF, GERMANY, ASSIGNOR TO CHEMISCHE FABRIK REISHOLZ, G. M. B. H., OF DUSSELDORF-REISHOLZ, GERMANY.

MANUFACTURE OF HARMLESS COMBINATIONS OF SULFOCYANIC ACID.

1,010,447.     Specification of Letters Patent.     Patented Dec. 5, 1911.

No Drawing.     Application filed May 2, 1911. Serial No. 624,602.

*To all whom it may concern:*

Be it known that I, JOSEPH NERKING, a citizen of the Empire of Germany, residing at Dusseldorf, in the Empire of Germany, have invented a new and useful Manufacture of Harmless Combinations of Sulfocyanic Acid, of which the following is a specification.

Salts of sulfocyanic acid (HCNS), such as sulfocyanate of potassium, sulfocyanate of sodium, sulfocyanate of ammonium, have been employed as prophylactics against the decomposition of teeth and the mycodermitis, also as antispasmodics and sedatives, but they are objectionable on account of their poisonousness, for which reason they are nearly no longer employed.

My invention relates to the manufacture of new combinations of sulfocyanic acid, which are harmless and therefore suitable for medical purposes.

The invention essentially consists in the combination of salts of sulfocyanic acid with albumin of any description, either alone or in conjunction with other substances.

When salts of sulfocyanic acid are mixed with albumin in the dry or moist condition or with solvents, solid gummy bodies or solutions of the same respectively will be formed, which bodies when dry are partly difficultly soluble in water or spirit of wine and partly insoluble. The soluble part of the bodies coagulates on boiling the solution, also on the addition of stronger acids, while the insoluble part simply swells up in water. Both parts contain more or less sulfocyanic acid (HCNS) in proportion to the concentration of the reacting solutions. Such combinations of the sulfocyanic acid may be formed from animal albumins (ovalbumin, casein) as well as from vegetable albumins; however, the casein and the vegetable albumins require to be first dissolved by the addition of an alkali or an alkaline earth, such as for example carbonate of sodium or hydrate of lime.

The mixing of the salts of sulfocyanic acid with albumin ground as finely as possible does not present any difficulties, provided that the quantities are small; the mixture agglomerates and forms a plastic mass, which is dried at a moderate temperature, preferably at 40° centigrade. When the quantities are a little larger, it is advisable to add so much water or rather spirit of wine as to render the mixing easy. For larger quantities it is best to let the two components, viz. the albumin and the salt of sulfocyanic acid, act upon each other in a watery solution, or the salt of sulfocyanic acid may be added undissolved or in an alcoholic solution. The solution may be concentrated and dried up by evaporation *in vacuo* at a temperature of under 50° centigrade, or the sulfocyanate of albumin may be separated with the aid of spirit of wine as a gummy coagulated mass, which can be easily dried up at about 40° centigrade.

When to a concentrated solution of albumin a larger quantity of undissolved salt of sulfocyanic acid is added, the whole mass will coagulate and the sediment can be separated by pressing, washed out with a little spirit of wine and dried at 40° centigrade. This is for example the case, if the concentrated solution of albumin is made by dissolving 2 kilograms of dry ovalbumin in 5 liters of water, and from 4 to 5 kilograms of sulfocyanate of ammonium are added to this solution. The preparation so obtained contains about 33% of HCNS and can be mixed with any quantity of powdered albumin so as to obtain any percentage of HCNS required by the physician.

The last named method has been found to be the most preferable for large quantities and for preparations richest in sulfocyanate of albumin.

It does not matter, whether sulfocyanate of ammonium or sulfocyanate of potassium or sulfocyanate of sodium or sulfocyanate of calcium or sulfocyanate of strontium or any other salt of sulfocyanic acid be employed in the process, since in the combination with the albumin only the sulfocyanic acid is a considerable component.

I claim:

1. The method of manufacturing harmless combinations of sulfocyanic acid, which consists in mixing an albumin with a salt of sulfocyanic acid, and drying the mass.

2. The method of manufacturing harmless combinations of sulfocyanic acid, which consists in dissolving an albumin in a solvent, mixing the solution with a salt of sulfocyanic acid, and drying the mass.

3. The method of manufacturing harmless combinations of sulfocyanic acid, which consists in dissolving an albumin in a solvent, adding a salt of sulfocyanic acid, thickening the resulting solution by evaporation in vacuo, and drying the mass.

4. The method of manufacturing harmless combinations of sulfocyanic acid, which consists in dissolving an albumin in a solvent, adding an alcoholic solution of a salt of sulfocyanic acid, thickening the resulting combination by evaporation *in vacuo*, and drying the mass.

JOSEPH NERKING. [L. S.]

Witnesses:
 ALFRED HENKEL,
 JULIN BERGER.